L. C. MILLER.
SPIRIT LEVEL.
APPLICATION FILED FEB. 10, 1910.
981,211.
Patented Jan. 10, 1911.
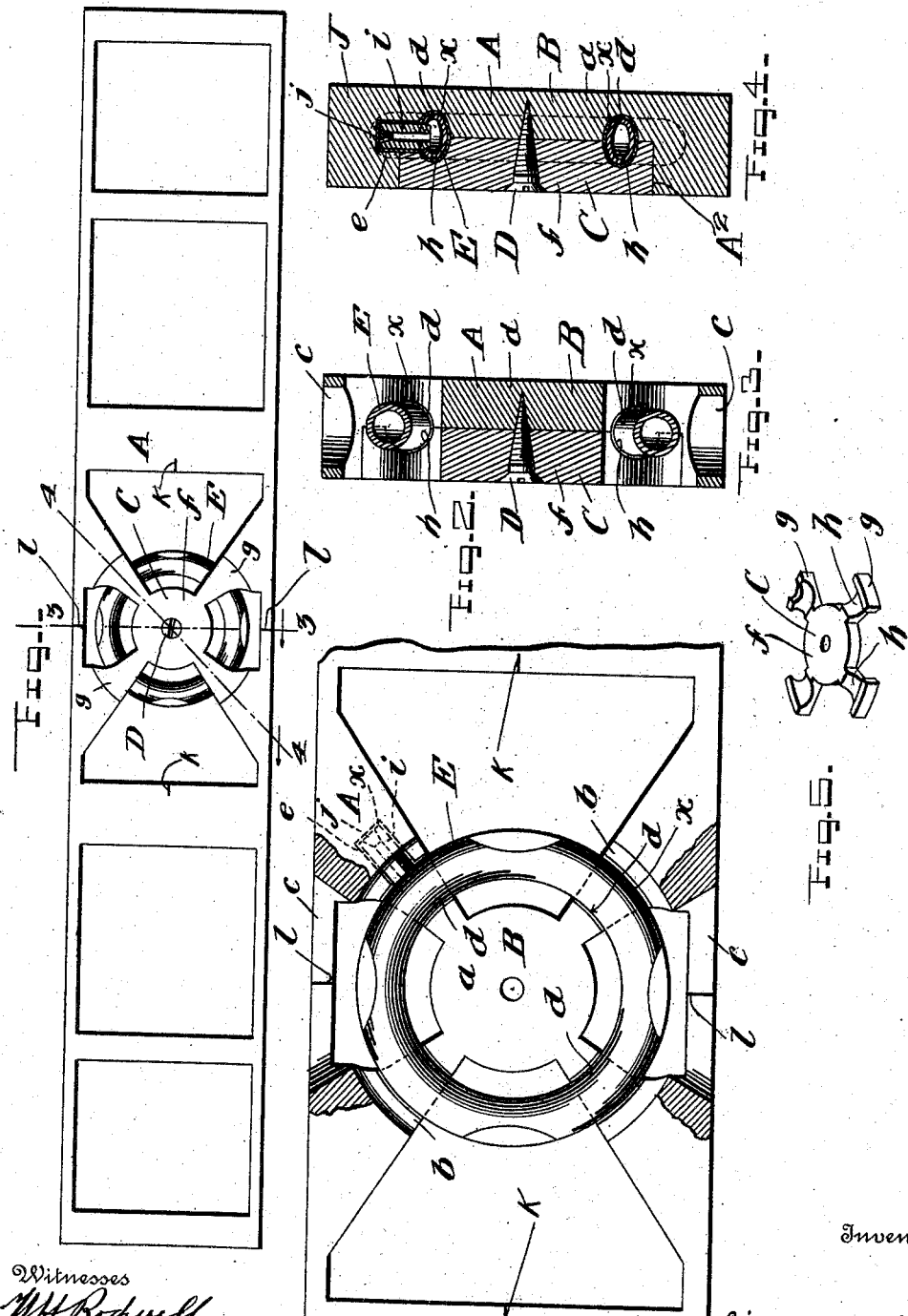

UNITED STATES PATENT OFFICE.

LINNEUS C. MILLER, OF CINCINNATI, IOWA.

SPIRIT-LEVEL.

981,211.  Specification of Letters Patent.  Patented Jan. 10, 1911.

Application filed February 10, 1910. Serial No. 543,135.

*To all whom it may concern:*

Be it known that I, LINNEUS C. MILLER, a citizen of the United States, residing at Cincinnati, in the county of Appanoose and State of Iowa, have invented certain new and useful Improvements in Spirit-Levels, of which the following is a specification.

My present invention relating to spirit levels, has for its object to provide a simple and inexpensive spirit level adapted to be applied in various positions to work that is being done, and one embodying simple and efficient means for safely securing the fragile circular spirit-containing tube in its body and for incasing and protecting the said tube in such manner that ample portions of the same are exposed to view to permit of the level being used to advantage in various positions relative to work.

The invention will be fully understood from the following description and claims, considered conjunctively with the drawings, accompanying and forming part of this specification, in which:

Figure 1 is a side elevation showing a spirit level constructed in accordance with my invention. Fig. 2 is an enlarged detail side elevation, partly in section, of the same with the tube-retaining section removed, but with the tube properly positioned in the body. Fig. 3 is a full transverse section taken in the plane of the line 3—3 on Fig. 1. Fig. 4 is a section taken in the plane indicated by the line 4—4 of Fig. 1 and showing the arrangement of the tube nipple in the radial socket communicating with the recess in the body. Fig. 5 is a detail perspective view showing the inner side of the retaining section.

Similar letters designate corresponding parts in all of the views of the drawings, referring to which:

A is the body of my spirit-level, which is preferably of wood, though it may be of any other material suitable to its purpose. The said body is provided with a central spider B, Figs. 2—4, comprising a disk $a$ and arms $b$ and is also provided at one side of the spider with a large recess $A^2$, as shown. It will also be observed by comparison of the figures of the drawings that the body A is provided in its longitudinal edge portions with slots $c$, and that the spider arms $b$ are provided in their inner sides with curvilinear seats $d$ which if continued would describe a circle. It will further be noted that a socket $e$ is formed in the body A for an important purpose hereinafter set forth, and that the said socket communicates with the large recess and extends radially outward from one of the seats $d$ and is closed at its outer end, Fig. 4.

C is the section for retaining the spirit-tube in the described recess and against the spider B of body A. The said section C is of the same outline as the spider B and has an apertured disk $f$, arms $g$, and curvilinear seats $h$ in the inner sides of the latter; the said seats $h$ being designed to rest opposite the seats $d$ in the spider arms, as shown. The aperture in the disk of section C is for the reception of a screw D through the medium of which the said section is detachably connected to the disk $a$ of the spider B.

E is the tube of the level, which is preferably of glass and substantially circular in general configuration as well as in cross-section, and is designed to contain spirit or any other mobile substance suitable to the purpose; the term spirit as herein used being intended to comprehend any such substance. The said tube is provided with a radially-disposed filling nipple $i$, normally closed by a stopper $j$, which nipple may either be formed integrally with the spirit tube or be inserted into an aperture suitably formed therein.

The body A is provided, by preference, with pointers $k$ disposed parallel to its longitudinal edges, and pointers $l$ arranged midway between the pointers $k$ and disposed parallel to the ends of the said body A.

In practice the tube E after being charged with a proper quantity of spirit to afford the conventional air bubble, is closed and placed in the seats $d$ of spider B, and its nipple $i$ is disposed in the socket $e$. The retaining section C is then placed in the recess of the body A and over the tube E and is connected to the body through the medium of the screw D. With this done it will be manifest that the tube will be secured in position in the body in such manner that liability of its being broken in use is reduced to a minimum, and yet adequate portions of said tube are exposed for all practical purposes.

The groove in one arm of the spider B and the similar groove in one arm of the retaining section C are wider than the nipple $i$ as is also the socket $e$ in body A, and from this it follows that when the screw D is loosened, the spirit tube E may be turned and adjusted within certain limits. When, however, said screw D is tightened, it will be observed that the tube E will be clamped and securely held between the retaining section C and the body A.

To assist in holding the tube E against casual movement and also to lessen the liability of the same being fractured or scratched, I prefer to line the several grooves as well as the socket e with felt or other suitable soft material x connected to the walls of the same by an adhesive or other suitable means.

In the use of my novel level it is manifestly ever ready for the hand of the mechanic and does not have to be turned to apply it to work since either longitudinal edge when applied to an upright will give a plumb, and either of said edges laid on a horizontal piece of work will indicate if the same is level.

While the tube E is securely held and protected in the manner described, it will be readily understood that in the event of the tube being broken it may be expeditiously and easily removed following the removal of screw D and retaining section C, in the order named, and then a new tube may as readily be placed and secured in the body A and between the same and the section C.

It will be gathered from the foregoing that my novel spirit level is simple and inexpensive in construction, compared with its range of usefulness, and that, as a whole, it is well adapted to withstand the usage to which spirit levels are ordinarily subjected.

I have specifically described the construction and relative arrangement of the parts comprised in my novel level in order to impart an exact understanding of the same in all of its details. I do not desire, however, to be understood as confining myself to said specific construction and relative arrangement of parts, as obviously in practice such changes or modifications may be made as do not involve departure from the spirit of my invention as outlined in the appended claims.

Having described my invention, what I claim and desire to secure by Letters Patent, is:

1. In a spirit level, the combination of a body having a recess in one side, and provided with slots in the longitudinal edges of said recess in communication therewith, and provided also with a radial socket communicating at its inner end with the recess and closed at its outer end, and a spider disposed at the inner side of the recess and made up of a central disk and arms extending from said disk and provided with curvilinear seats in their inner sides; a circular spirit tube arranged in said recess and seats of the body and having a radial nipple disposed in the radial socket of the body; a retaining section arranged over the tube and in the recess and opposite the spider of the body and having a central apertured disk and arms extending from the same and provided in their inner sides with seats receiving the tube; and a screw extending through the apertured disk of the retaining section and into the body and serving to detachably connect the former to the latter.

2. In a spirit level, the combination of a body having a recess in one side and provided with slots in the longitudinal edges of said recess in communication therewith and provided also with a radial socket communicating at its inner end with the recess and closed at its outer end, and a spider disposed at the inner side of the recess and made up of a central disk and provided with curvilinear seats, soft material lining said curvilinear seats, a spirit tube comprising a substantially circular body-portion having a filling-neck extending radially therefrom and adapted to rest upon said curvilinear seats in the arms of the spider, a retaining section fitting into said recess and arranged over said spirit level, said retaining section being of substantially the same form as the spider and provided with a central aperture, and a screw extending through said central aperture and into the body to detachably connect the retaining section with the body.

3. In a spirit level, the combination of a body having a recess in one side and provided with slots in the longitudinal edges of said recess in communication therewith and provided also with a socket communicating at its inner end with the recess and closed at its outer end, a spider disposed at the inner side of the recess, and made up of a central disk and arms extending from said disk and provided with curvilinear seats, a spirit tube arranged in said recess and seats of the body and having a nipple disposed in the socket of the body, and a detachable retaining section arranged over said tube.

In testimony whereof I affix my signature in presence of two witnesses.

LINNEUS C. MILLER.

Witnesses:
GEO. C. SAYRES,
SETH R. ROLL.